United States Patent
Shen et al.

(10) Patent No.: US 7,568,073 B2
(45) Date of Patent: Jul. 28, 2009

(54) MECHANISMS AND METHODS OF CACHE COHERENCE IN NETWORK-BASED MULTIPROCESSOR SYSTEMS WITH RING-BASED SNOOP RESPONSE COLLECTION

(75) Inventors: Xiaowei Shen, Hopewell Junction, NY (US); Karin Strauss, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/556,876

(22) Filed: Nov. 6, 2006

(65) Prior Publication Data

US 2008/0109609 A1 May 8, 2008

(51) Int. Cl.
*G06F 12/00* (2006.01)
(52) U.S. Cl. .................... 711/145; 711/146; 711/156
(58) Field of Classification Search .............. 711/145, 711/146, 156
See application file for complete search history.

(56) References Cited

U.S. PATENT DOCUMENTS

| | | | | |
|---|---|---|---|---|
| 5,588,131 | A * | 12/1996 | Borrill | 711/146 |
| 6,253,292 | B1 * | 6/2001 | Jhang et al. | 711/146 |
| 6,516,391 | B1 * | 2/2003 | Tsushima et al. | 711/146 |
| 7,437,520 | B2 * | 10/2008 | Shen et al. | 711/146 |
| 2005/0240735 | A1 * | 10/2005 | Shen et al. | 711/144 |
| 2007/0011408 | A1 * | 1/2007 | Shen et al. | 711/146 |

* cited by examiner

*Primary Examiner*—Stephen C Elmore
(74) *Attorney, Agent, or Firm*—F. Chau & Associates, LLC

(57) ABSTRACT

A computer-implemented method for enforcing cache coherence includes multicasting a cache request for a memory address from a requesting node without an ordering restriction over a network, collecting, by the requesting node, a combined snoop response of the cache request over a unidirectional ring embedded in the network, and enforcing cache coherence for the memory address at the requesting node, according to the combined snoop response.

18 Claims, 11 Drawing Sheets

MECHANISMS AND METHODS OF CACHE COHERENCE IN NETWORK-BASED MULTIPROCESSOR SYSTEMS WITH RING-BASED SNOOP RESPONSE COLLECTION

BACKGROUND OF THE INVENTION

1. Technical Field

The present invention relates to cache coherence mechanisms, and more particularly, to cache coherence in network-based multiprocessor systems with ring-based snoop response collection.

2. Description of Related Art

A symmetric multiprocessor ("SMP") system employs a cache coherence mechanism to ensure cache coherence. Snoop-based cache coherence is a typical approach for implementing cache coherence for SMP systems. With snoop-based cache coherence, when a cache miss occurs, the requesting cache broadcasts a cache request to its peer caches. An appropriate cache snoop filtering mechanism can be used to reduce overhead due to cache coherence messages and cache snoop operations. Traditionally, snoop-based cache coherence is implemented in a bus-based SMP system in which caches communicate with each other via a shared bus. To avoid a potential communication bottleneck, a modern SMP system typically uses a message-passing network rather than a physically shared bus. Such SMP systems are referred to as network-based SMP systems.

Referring now to FIG. 1, an exemplary cache-coherent multiprocessor system is shown that comprises multiple nodes interconnected via an inter-node interconnect network, wherein each node comprises a central processing unit ("CPU") and a cache. Also connected to the inter-node interconnect network are a memory and input/output ("IO") devices. Although the memory is depicted as one component, the memory can be physically distributed into multiple memory portions, wherein each memory portion is operatively associated with a node.

Referring now to FIG. 2, another exemplary cache-coherent multiprocessor system is shown that comprises multiple nodes interconnected via an inter-node interconnect, wherein each node comprises a chip multiprocessor ("CMP") subsystem. Each CMP subsystem comprises one or more caches that can communicate with each other via an intra-node fabric. A memory portion, as well as IO devices, can also be connected to the intra-node fabric.

With snoop-based cache coherence, when a read cache miss occurs, the requesting cache typically broadcasts a cache data request to its peer caches and to the memory. When a peer cache receives the cache data request, the peer cache performs a local cache snoop operation and produces a cache snoop response indicating whether the requested data is found in the peer cache and the state of the corresponding cache line. If the requested data is found in a peer cache, the peer cache may supply the data to the requesting cache via a cache-to-cache transfer. The memory is responsible for supplying the requested data if no peer cache can supply the data.

In a cache coherent SMP system, a cache request can be a cache data request that intends to obtain a shared copy of requested data, a cache data-and-ownership request that intends to obtain an exclusive copy of requested data, or an ownership request that intends to invalidate shared copies of requested data in other caches.

A number of techniques for achieving snoop-based cache coherence are known to those skilled in the art. For example, the MESI snoopy cache coherence protocol and its variants have been widely used in SMP systems. As the name suggests, MESI has four cache states: modified (M), exclusive (E), shared (S) and invalid (I). If a cache line is in an invalid state in a cache, the data is not valid in the cache. If a cache line is in a shared state in a cache, the data is valid in the cache and can also be valid in other caches. This state is entered, for example, when the data is retrieved from the memory or another cache, and the corresponding snoop responses indicate that the data is valid in at least one of the other caches. If a cache line is in an exclusive state in a cache, the data is valid in the cache, and cannot be valid in any other cache. Furthermore, the data has not been modified with respect to the data maintained in the memory. This state is entered, for example, when the data is retrieved from the memory or another cache, and the corresponding snoop responses indicate that the data is not valid in any other cache. If a cache line is in a modified state in a cache, the data is valid in the cache and cannot be valid in any other cache. Furthermore, the data has been modified as a result of a memory store operation, and the modified data has not been written to the memory.

With snoop-based cache coherence, when a cache miss occurs, if the requested data is found in both memory and another cache, supplying the data via a cache-to-cache transfer is often preferred because cache-to-cache transfer latency is typically smaller than memory access latency. For example, in the IBM® Power 4 system, when data of an address is shared in one or more caches in a multi-chip module, the cache with the last received shared copy can supply the data to another cache in the same multi-chip module via a cache-to-cache transfer.

A cache is referred to as a requesting cache of a cache request, if the cache request is originally generated from the cache. A cache is referred to as a snooping cache of a cache request, if the cache needs to be snooped in servicing the cache request. A cache is referred to as a supplying cache of a cache request, if the cache supplies requested data to the requesting cache.

Likewise, a node is referred to as a requesting node of a cache request, if the cache request is originally generated from a cache in the node. A node is referred to as a snooping node of a cache request, if at least one cache in the node needs to be snooped in servicing the cache request. A node is referred to as a supplying node of a cache request, if a cache in the node supplies requested data to the requesting node.

In a bus-based SMP system, the bus behaves as a central arbitrator that serializes all bus transactions to ensure a total order of bus transactions. In a network-based SMP system, messages can be received in different orders at different receiving caches. This lack of serialization guarantee of coherence messages makes it difficult to provide efficient cache coherence support. Therefore, a need exists for a mechanism that can efficiently support cache coherence in a network-based multiprocessor system.

SUMMARY OF THE INVENTION

According to an embodiment of the present disclosure, a computer-implemented method for enforcing cache coherence includes multicasting a cache request for a memory address from a requesting node without an ordering restriction over a network, collecting, by the requesting node, a combined snoop response of the cache request over a unidirectional ring embedded in the network, and enforcing cache coherence for the memory address at the requesting node, according to the combined snoop response.

According to an embodiment of the present disclosure, a system of cache coherence, includes a plurality of nodes connected by a network, the network comprising an embedded unidirectional ring, and a cache coherence mechanism implementing cache coherence for the system, wherein the cache coherence mechanism uses the network to deliver a cache request for a memory address without any ordering restriction, and uses the embedded unidirectional ring to collect a combined snoop response for the cache request.

According to an embodiment of the present disclosure, a computer readable medium is provided embodying instructions executable by a processor to perform a method for enforcing cache coherence. The method includes multicasting a cache request for a memory address from a requesting node without an ordering restriction over a network, collecting, by the requesting node, a combined snoop response of the cache request over a unidirectional ring embedded in the network, and enforcing cache coherence for the memory address at the requesting node, according to the combined snoop responses.

BRIEF DESCRIPTIONS OF THE DRAWINGS

Preferred embodiments of the present disclosure will be described below in more detail, with reference to the accompanying drawings.

DETAILED DESCRIPTION OF PREFERRED EMBODIMENTS

Figure 1:
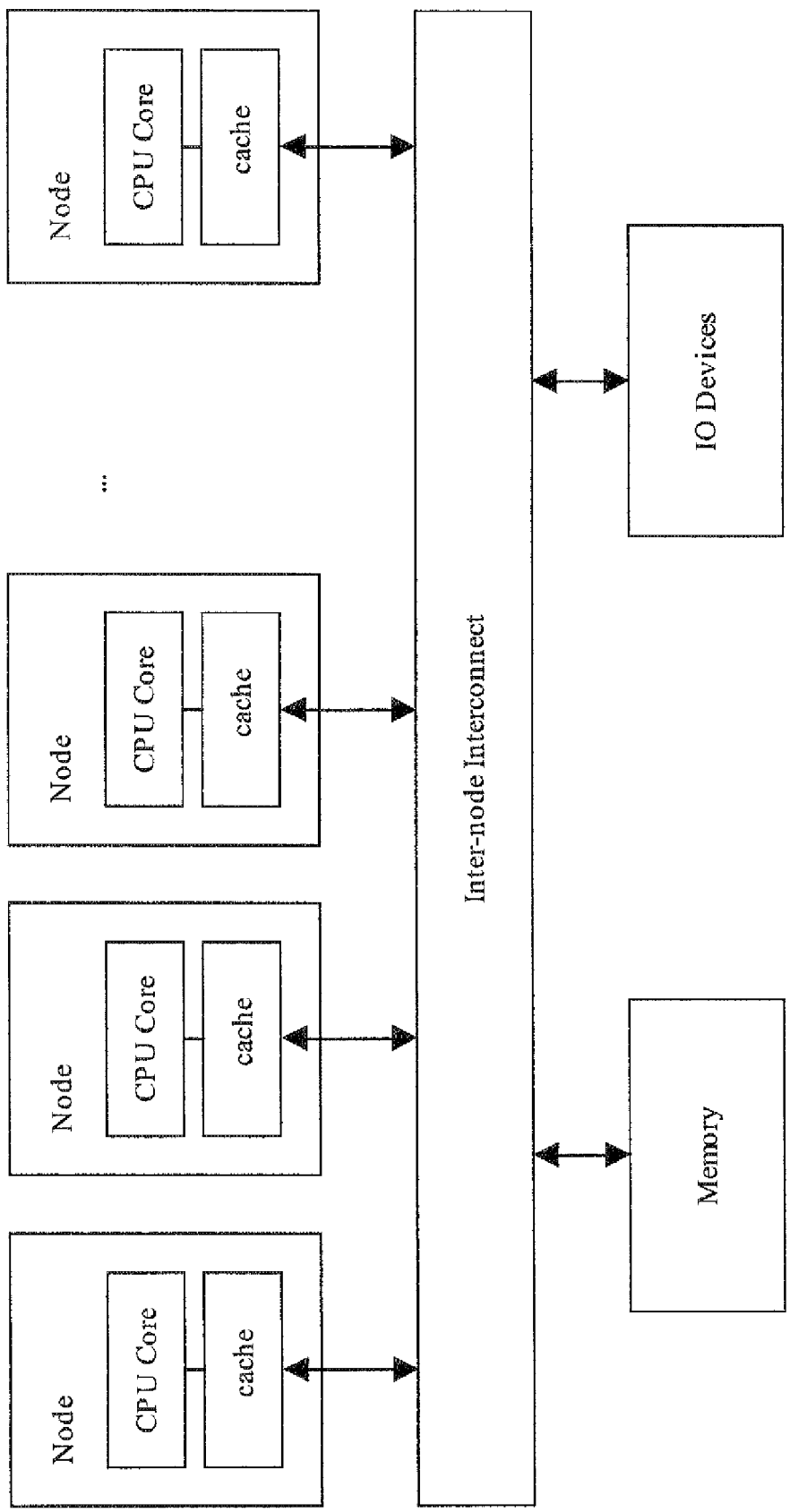
FIG. 1 depicts an exemplary cache-coherent multiprocessor system that comprises multiple nodes interconnected via an inter-node interconnect network, wherein each node comprises a CPU and a cache.
Figure 2:
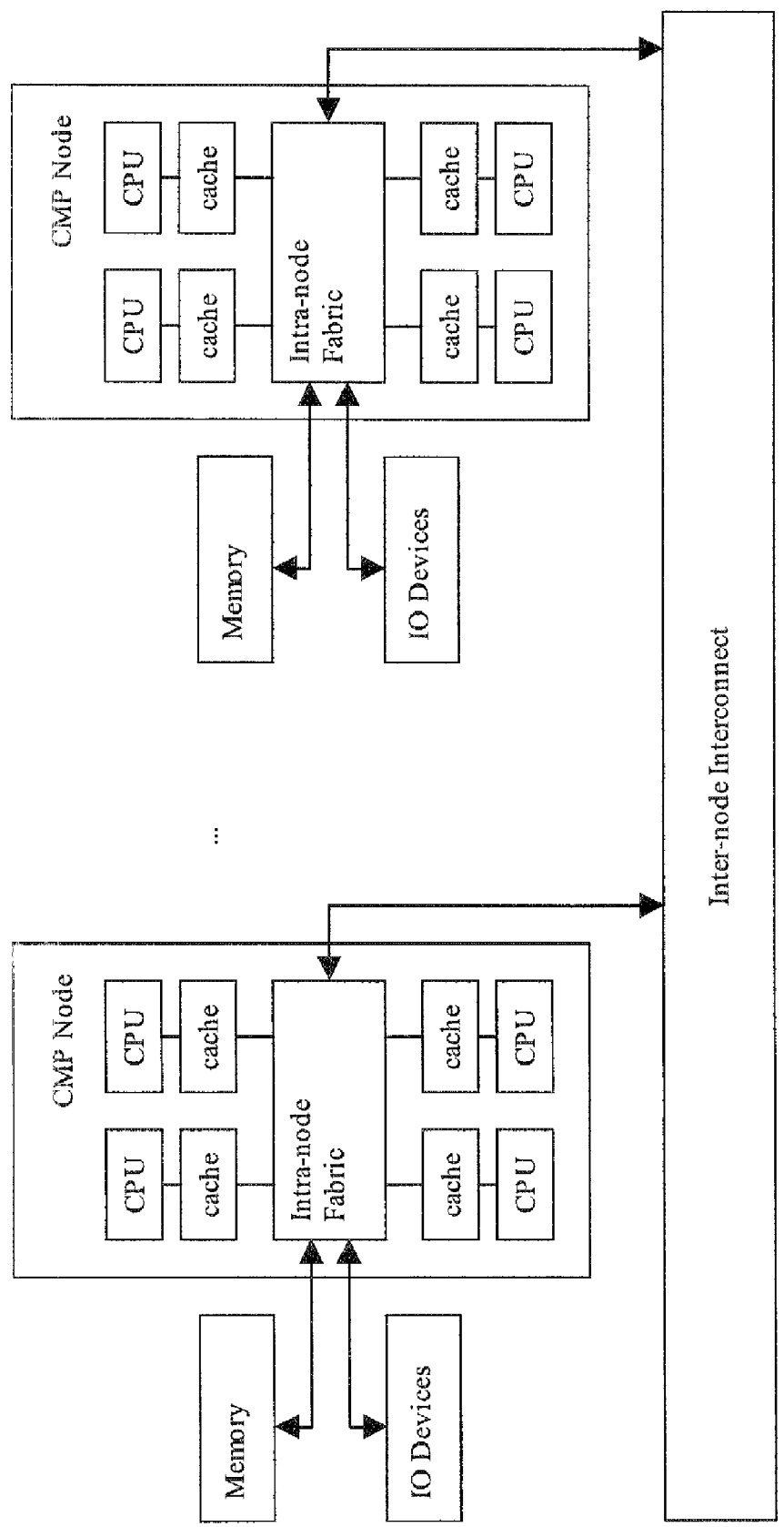
FIG. 2 depicts an exemplary cache-coherent multiprocessor system that comprises multiple nodes interconnected via an inter-node interconnect network, wherein each node comprises a CMP subsystem that comprises one or more caches.

According to an embodiment of the present disclosure, cache coherence in a network-based multiprocessor system is implemented using ring-based snoop response collection. The cache coherence mechanism multicasts a cache request using the interconnect network of the multiprocessor system without any ordering restriction, while using a unidirectional ring embedded in the interconnect network to collect cache snoop responses.

A cache-coherent system comprises multiple nodes that are connected with each other via an interconnect network. The interconnect network logically comprises a request network, a response network and a data network. The request network is used for cache request transfers, the response network is used for cache snoop response transfers, and the data network is used for all other transfers, including cache-to-cache data transfers and data transfers between caches and the memory. Although logically independent with each other, the request network, the response network and the data network may physically share communication pins and links.

Given a memory address, the response network comprises a unidirectional ring that can be used to deliver cache snoop responses. Different memory addresses (typically at cache line granularity) may use different unidirectional rings embedded in the network for cache snoop responses, provided that cache snoop responses of the same memory address use the same unidirectional ring.

Given a snooping node of a cache request, a node is referred to as a preceding node if the node is preceding the snooping node in the embedded unidirectional ring; a node is referred to as a subsequent node if the node is subsequent to the snooping node in the embedded unidirectional ring. A snooping node of a cache request is referred to as a first snooping node if the snooping node is subsequent to the requesting node in the embedded unidirectional ring. A snooping node of a cache requests is referred to as a last snooping node if the requesting node is subsequent to the snooping node in the unidirectional ring interconnect network.

When a snooping cache performs a cache snoop operation, the snooping cache generates a cache snoop response indicating the cache snoop result. A cache snoop response is referred to as a local snoop response (LSR) if the cache snoop response indicates the outcome of a local cache snoop operation at only one snooping node. A cache snoop response is referred to as a partially combined snoop response (PCSR) if the cache snoop response indicates the outcome of local cache snoop operations at one or more snooping nodes. A cache snoop response is referred to as a combined snoop response (CSR) if the cache snoop response indicates the outcome of local cache snoop operations at all snooping nodes of the cache request. Furthermore, a cache snoop response is referred to as a positive snoop response if the cache snoop response indicates that a snooping node can supply requested data to the requesting node; a cache snoop response is referred to as a negative snoop response if the cache snoop response indicates that no snooping node can supply requested data to the requesting node.

According to an illustrative embodiment of the present disclosure, when a cache miss of a memory address occurs in a requesting mode, the requesting node sends a proper cache request to all snooping nodes using the request network without any ordering restriction. If requested data is needed, the requesting node can use the requested data in its computation once the requested data is received, regardless of whether the corresponding CSR is received. The requesting node completes servicing the cache request when it receives the CSR and the requested data (if any).

When a snooping node receives a cache request from a requesting node, the snooping node performs a local cache snoop operation to generate an LSR; and computes a new PCSR from the LSR and a preceding PCSR of the cache request if the preceding PCSR from a preceding node has been received and recorded, or records the LSR for later use if a preceding PCSR of the cache request has not been received. The snooping node needs to determine whether to forward the new PCSR to a subsequent node using the embedded unidirectional ring, or to record the new PCSR (and forward it later).

When a snooping node receives a preceding PCSR of a cache request from a preceding node, the snooping node computes a new PCSR from the preceding PCSR and a previously recorded LSR of the cache request if the LSR has been generated and recorded, or records the preceding PCSR for later use if the LSR has not been generated. The snooping node needs to determine whether to forward the new PCSR to a subsequent node using the embedded unidirectional ring, or to record the new PCSR (and forward it later).

To compute a new PCSR of a cache request, a snooping node uses the following method: if the preceding PCSR indicates that data has not been supplied to the requesting node (negative PCSR) and the LSR indicates that data has not been supplied to the requesting node (negative LSR), the new PCSR indicates that data has not been supplied to the requesting node (negative PSCR). On the other hand, if either of the preceding PCSR or the LSR indicates that requested data has been supplied to the requesting node (positive PCSR or positive LSR), the new PCSR indicates that data has been supplied to the requesting node (positive PCSR).

A requesting node may receive a data request, data-and-ownership request, or ownership request when a cache miss occurs in a cache in the requesting node. A snooping node may receive a cache request or PCSR. We now show how such requests and snoop responses are handled in cache-coherent multiprocessor systems with ring-based snoop response collection.

(1) Handling of a Data Request (at a Requesting Node)

Figure 3:
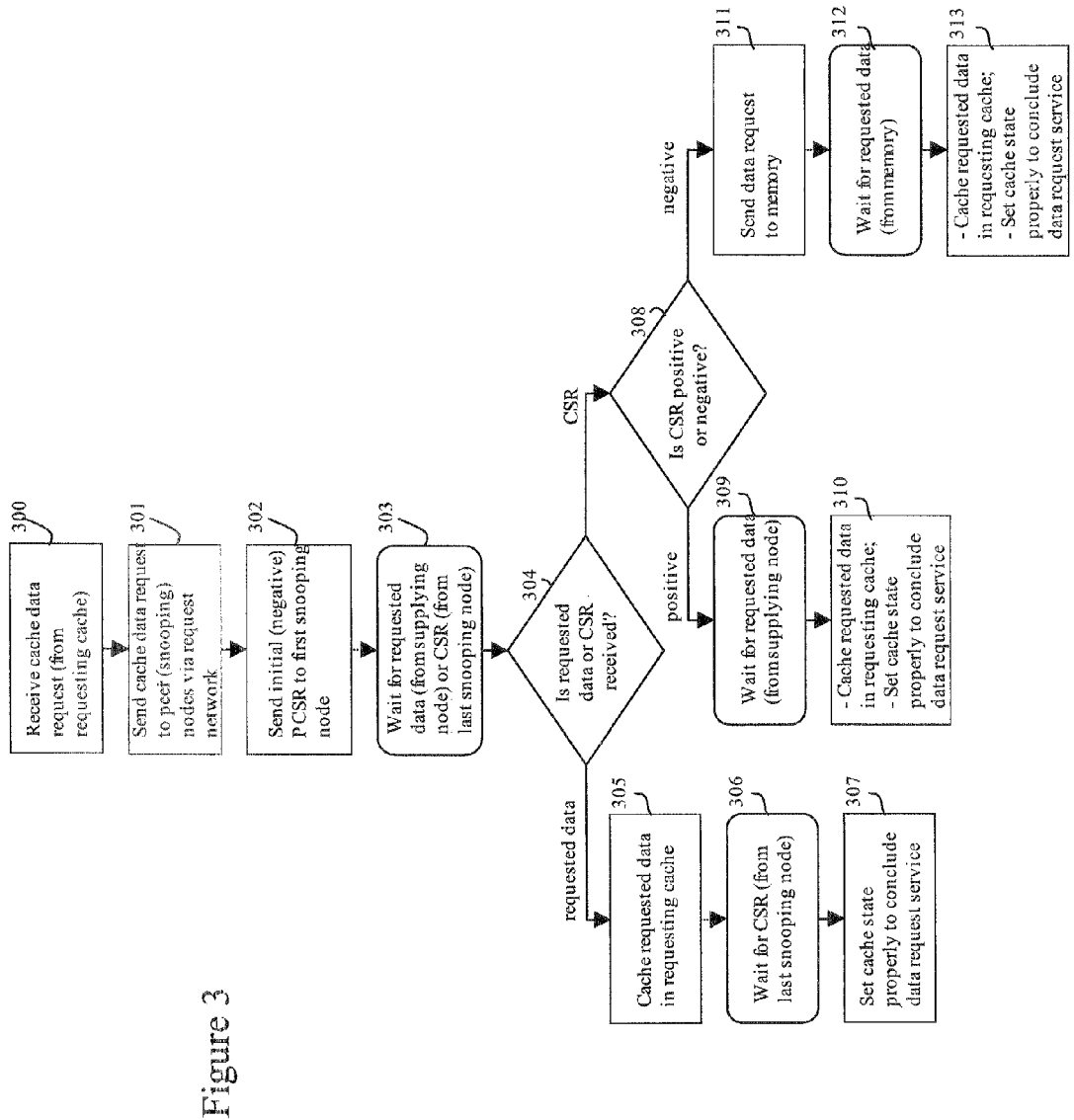
FIG. 3 shows a flow diagram illustrating how a requesting node handles an incoming data request.

FIG. 3 shows a flow diagram illustrating how a requesting node handles an incoming data request when a cache miss occurs in a requesting cache in the requesting node. When a requesting node receives a cache data request from a requesting cache (300), the requesting node sends a cache data request to the snooping nodes using the request network (301), and sends an initial (negative) PCSR of the cache request to the first snooping node of the cache request using the response network (302). The cache data request sent from the requesting node to the first snooping node can be piggybacked with the initial PCSR using the response network. The requesting node waits to receive either the requested data from a supplying node or the CSR of the cache request from the last snooping node of the cache request (303). The snooping node checks whether the snooping node has received the requested data or the CSR of the cache request (304).

If the snooping node has received the requested data from the supplying node, the requesting node caches the received data in the requesting cache (305) and waits to receive the CSR of the cache request from the last snooping node (306). When the CSR of the cache request is received from the last snooping node, the requesting node sets the requesting cache state properly to conclude the cache request service (307).

If the requesting node has received the CSR of the cache request from the last snooping node of the cache request, the requesting node checks whether the CSR of the cache request is positive or negative (308). If the CSR of the cache request is positive, the requesting node waits to receive the requested data from the supplying node (309). When the requested data is received from the supplying node, the requesting node caches the received data in the requesting cache and sets the requesting cache state properly to conclude the cache request service (310). Otherwise, if the CSR of the cache request is negative, the requesting node sends a data request to memory (311) and waits to receive the requested data from memory (312). When the requesting node receives the requested data from memory, the requesting node caches the received data in the requesting cache and sets the requesting cache state properly to conclude the cache data request service (313).

(2) Handling of a Data-and-ownership Request (at a Requesting Node)

Figure 4:
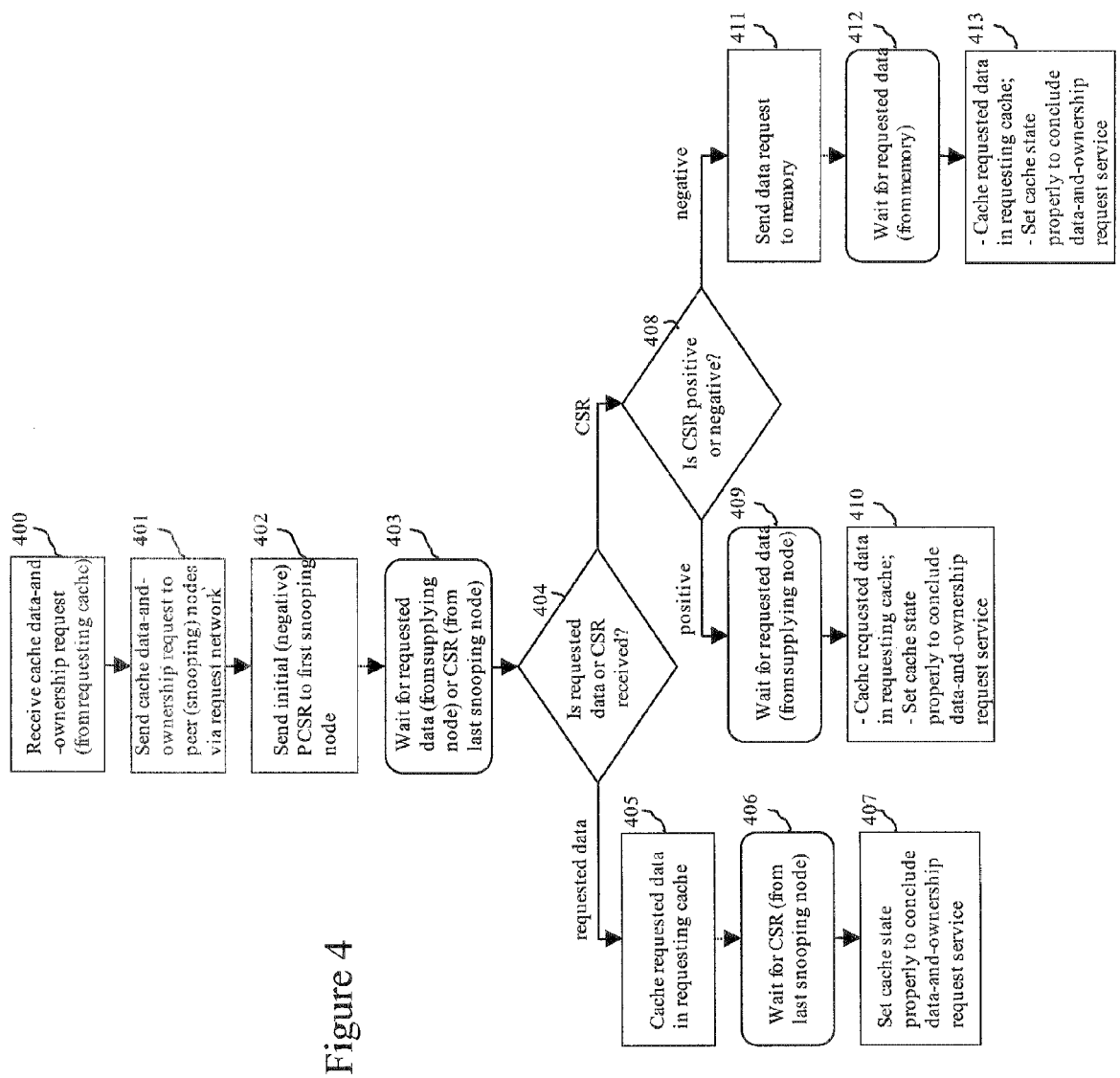
FIG. 4 shows a flow diagram illustrating how a requesting node handles an incoming data-and-ownership request.

FIG. 4 shows a flow diagram illustrating how a requesting node handles an incoming data-and-ownership request when a cache miss occurs in a requesting cache in the requesting node. When a requesting node receives a cache data-and-ownership request from a requesting cache (400), the requesting node sends a cache data-and-ownership request to the snooping nodes using the request network (401), and sends an initial (negative) PCSR of the cache request to the first snooping node of the cache request using the response network (402). The cache data-and-ownership request sent from the requesting node to the first snooping node can be piggybacked with the initial PCSR using the response network. The requesting node waits to receive either the requested data from a supplying node or a CSR of the cache request from the last snooping node (403). The requesting node checks whether it has received the requested data from the supplying node or the CSR of the cache request from the last snooping node (404).

If the requesting node has received the requested data from the supplying node, the requesting node caches the received data in the requesting cache (405) and waits to receive the CSR of the cache request from the last snooping node (406). When the CSR of the cache request is received from the last snooping node, the requesting node sets the requesting cache state properly to conclude the cache request service (407).

If the requesting node has received the CSR of the cache request from the last snooping node, the requesting node checks whether the CSR of the cache request is positive or negative (408). If the CSR of the cache request is positive, the requesting node waits to receive the requested data from the supplying node (409). When the requested data is received from the supplying node, the requesting node caches the received data in the requesting cache and sets the requesting cache state properly to conclude the cache data-and-ownership request service (410). Otherwise, if the CSR of the cache request is negative, the requesting node sends a data request to memory (411) and waits to receive the requested data from memory (412). When the requesting node receives the requested data from memory, the requesting node caches the received data in the requesting cache and sets the requesting cache state properly to conclude the cache data-and-ownership request service (413).

(3) Handling of an Ownership Request (at a Requesting Node)

Figure 5:
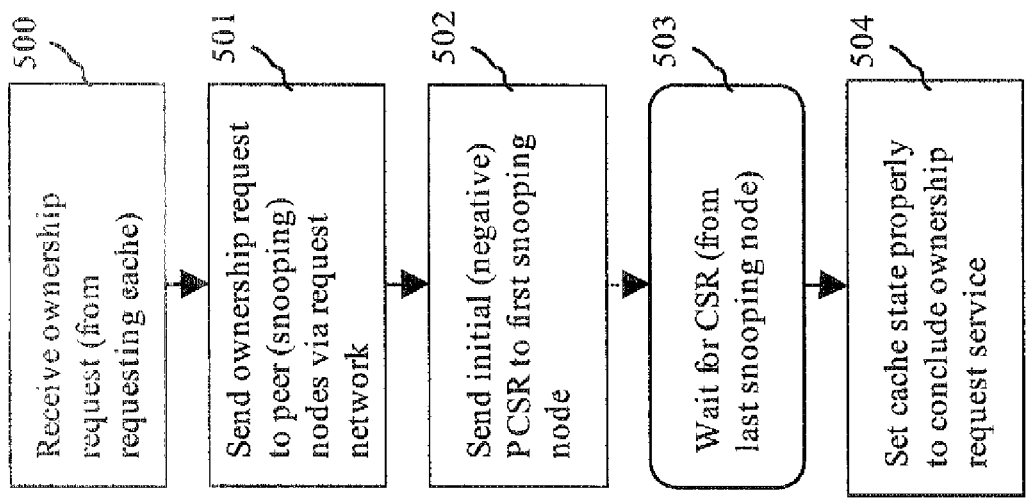
FIG. 5 shows a flow diagram illustrating how a requesting node handles an incoming ownership request.

FIG. 5 shows a flow diagram illustrating how a requesting node handles an incoming ownership request when a cache miss occurs in a requesting cache in the requesting node. When a requesting node receives a cache ownership request from a requesting cache (500), the node sends an ownership request to the peer (snooping) nodes using the request network (501), and sends an initial (negative) PCSR of the cache request to the first snooping node of the cache request using the response network (502). The cache ownership request sent from the requesting node to the first snooping node can be piggybacked with the initial PCSR using the response network. The requesting node waits to receive the CSR of the cache request from the last snooping node of the cache request (503). When the CSR of the cache request is received, the requesting node sets the requesting cache state properly to conclude the cache request service (504).

(4) Handling of a Cache Request (at a Snooping Node)

Figure 6:
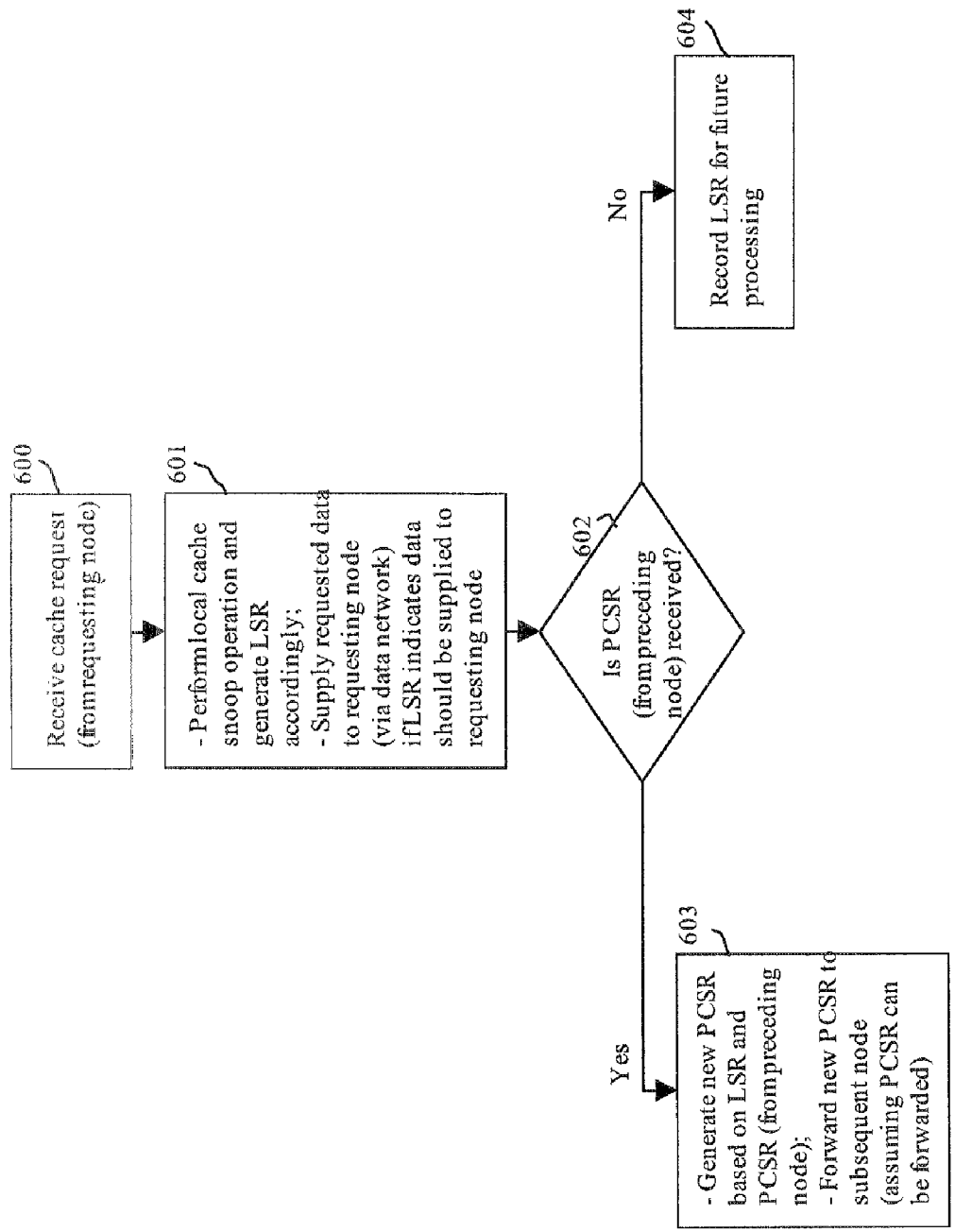
FIG. 6 shows a flow diagram illustrating how a snooping node handles an incoming cache request.

FIG. 6 shows a flow diagram illustrating how a snooping node handles an incoming cache request. When a snooping node receives a cache request from the requesting node (600), the snooping node performs a local cache snoop operation, generates an LSR of the cache request indicating whether the requested data should be supplied to the requesting node by the snooping node, and supplies data to the requesting node using the data network if the LSR of the cache request indicates the requested data should be supplied (601). The snooping node checks whether a preceding PCSR of the cache request is received from a preceding node (602). If the preceding PCSR of the cache request is received, the snooping node generates a new PCSR of the cache request based on the preceding PCSR of the cache request and the LSR of the cache request (603). The snooping node forwards the new PCSR of the cache request to a subsequent node using the response network (603). Otherwise, if the preceding PCSR of the cache request is not received, the snooping node records the LSR of the cache request for future processing (604).

(5) Handling of a PCSR (at a Snooping Node)

Figure 7:
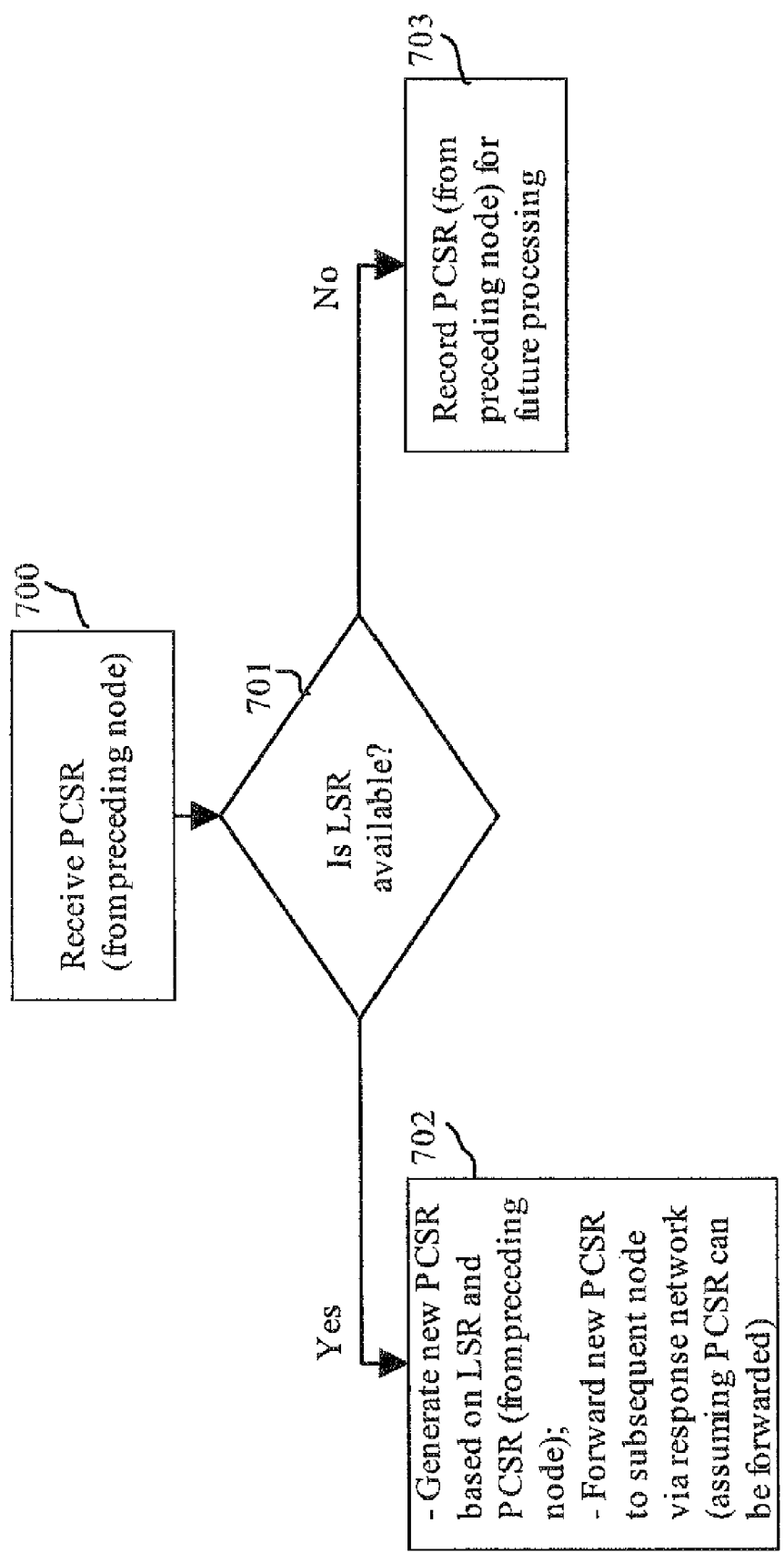
FIG. 7 shows a flow diagram illustrating how a snooping node handles an incoming partially combined snoop response (PCSR) of a cache request.

FIG. 7 shows a flow diagram illustrating how a snooping node handles an incoming PCSR. When a snooping node receives a preceding PCSR of a cache request from a preceding node (700), the snooping node checks whether there is an LSR of the cache request available at the snooping node (701). If there is an LSR of the cache request available, the snooping node generates a new PCSR of the cache request based on the preceding PCSR of the cache request received from the preceding node and the available LSR of the cache request (702). The snooping node forwards the new PCSR of the cache request to a subsequent node using the response network (702). Otherwise, if there is not an LSR of the cache request available at the snooping node, the snooping node records the preceding PCSR of the cache request received from the preceding node for future processing (703).

Coherence Conflict Detection Support

A coherence conflict can occur when more than one node issues a cache request regarding the same address simultaneously. Proper conflict handling is needed to ensure the system is cache coherent and can make forward progress. We now show how a snooping node handles a cache request and a preceding PCSR with proper conflict detection support.

According to an illustrative embodiment of the present disclosure, each node maintains a PCSR vector, wherein each bit of the PCSR vector corresponds to a requesting node, indicating whether a PCSR of a cache request from the corresponding requesting node has been received and has not been used to compute a new PCSR. Furthermore, each node maintains an LSR vector, wherein each bit of the LSR vector corresponds to a requesting node, indicating whether an LSR of a cache request from the corresponding requesting node has been generated and has not been used to compute a new PCSR. In addition, each node maintains DRN (Data Receiving Node) information, indicating a requesting node (if any) that has been supplied with requested data, wherein the PCSR vector indicates that a corresponding PCSR has been received and has not been used to compute a new PCSR, or the LSR vector indicates that a corresponding LSR has been generated and has not been used to compute a new PCSR.

For a snooping node, we use notion PCSR_V(r) to represent, for a requesting node r, whether a PCSR of a cache request issued by the requesting node r has been received by the snooping node and has not been used by the snooping node to generate a new PCSR to be forwarded to a subsequent node. If the PCSR_V(r) indicates AVAILABLE, a PCSR of a cache request from the requesting node r has been received by the snooping node and has not been used to generate a new PCSR. If the PCSR_V(r) indicates UNAVAILABLE, a PCSR of a cache request from the requesting node r has not been received by the snooping node, or a PCSR of a cache request form the requesting node has been received by the snooping node and has been used to generate a new PCSR. Initially, the PCSR vector indicates UNAVAILABLE for each requesting node in the system.

For a snooping cache, we use notion LSR_V(r) to represent, for a requesting cache r, whether an LSR of a cache request issued by the requesting node r has been generated by the snooping node and has not been used by the snooping node to generate a new PCSR to be forwarded to a subsequent node. If the LSR_V(r) indicates AVAILABLE, an LSR of a cache request from the requesting node r has been generated by the snooping node and has not been used to generate a new PCSR. If the LSR_V(r) indicates UNAVAILABLE, an LSR of a cache request from the requesting node r has not been generated by the snooping node, or an LSR of a cache request from the requesting node r has been generated by the snooping node and has been used to generate a new PCSR. Initially, the LSR vector indicates UNAVAILABLE for each requesting node in the system.

For a snooping node, we use notion DRN to represent a requesting node r that has been supplied with requested data, wherein PCSR_V(r) indicates AVAILABLE or LSR_V(r) indicates AVAILABLE. The initial value of DRN is none.

(6) Handling of a Cache Request with Coherence Conflict Detection (at a Snooping Node)

Figure 8:
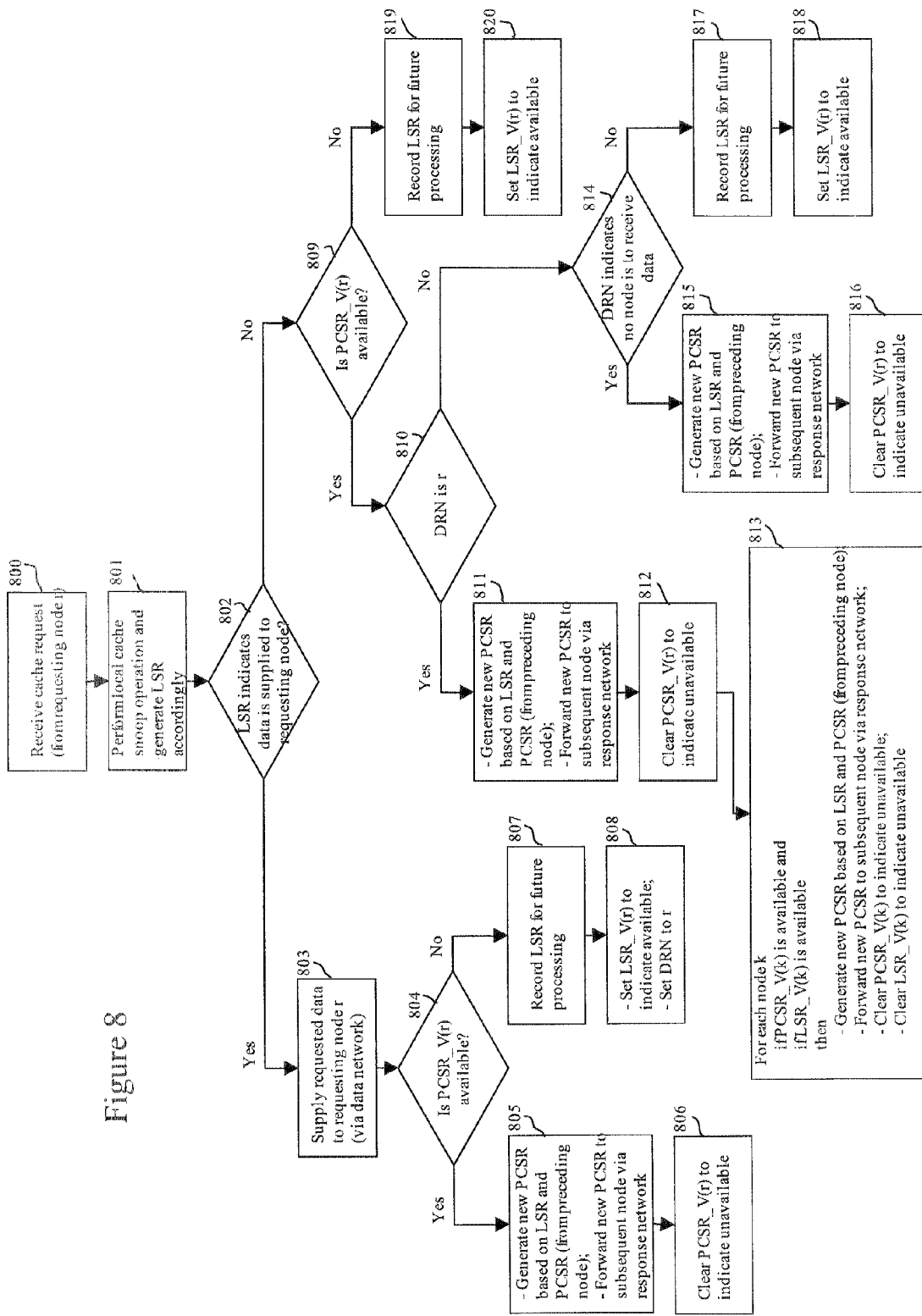
FIG. 8 shows a flow diagram illustrating how a snooping node, with coherence conflict detection support, handles an incoming cache request.

FIG. 8 shows a flow diagram illustrating how a snooping node, with coherence conflict detection support, handles an incoming cache request. When a snooping node receives a cache request from a requesting node r (800), the snooping node performs a local cache snoop operation and generates an LSR of the cache request indicating whether the requested data should be supplied to the requesting node by the snooping node (801). The snooping node checks whether the LSR of the cache request indicates that the requested data is supplied to the requesting node by the snooping node (802).

If the LSR of the cache request indicates that the requested data is supplied to the requesting node by the snooping node, the snooping node supplies data to the requesting node r using the data network (803). The snooping node checks whether PCSR_V(r) is AVAILABLE (804). If PCSR_V(r) is AVAILABLE, the snooping node generates a new PCSR of the cache request based on the PCSR of the cache request received from the preceding node and the LSR of the cache request, and forwards the new PCSR to the subsequent node using the response network (805). The snooping node clears PCSR_V(r) to indicate UNAVAILABLE (806). Otherwise, if PCSR_V(r) is UNAVAILABLE, the snooping node records the LSR of the cache request for future processing (807), and sets LSR_V(r) to indicate AVAILABLE and sets DRN to r (808).

If the LSR of the cache request indicates that the requested data is not supplied to the requesting node by the snooping node, the snooping node checks whether PCSR_V(r) is available (809). If PCSR_V(r) is UNAVAILABLE, the snooping node records the LSR of the cache request for future processing (819) and sets LSR_V(r) to indicate AVAILABLE (820). If PCSR_V(r) is AVAILABLE, the snooping node checks whether the DRN is set to r (810).

If the DRN is set to r, the snooping node generates a new PCSR of the cache request based on the PCSR of the cache request received from the preceding node and the LSR of the cache request, forwards the new PCSR of the cache request to the subsequent node using the response network (811), and clears PCSR_V(r) to indicate UNAVAILABLE (812). For each node k, if PCSR_V(k) indicates AVAILABLE and LSR_V(k) indicates AVAILABLE, the snooping node generates a new PCSR based on the corresponding recorded PCSR and the corresponding recorded LSR, forwards the new PCSR to the subsequent node using the response network, and clears PCSR_V(k) and LSR_V(k) to indicate UNAVAILABLE (813).

If the DRN is not set to r, the snooping node checks whether the DRN indicates that no requesting node is to receive data (814). If no requesting node is to receive data, the snooping node generates a new PCSR of the cache request based on the PCSR of the cache request received from the preceding node and the LSR of the cache request, forwards the new PCSR of the cache request to the subsequent node using the response network (815), and clears PCSR_V(r) to indicate UNAVAILABLE (816). Otherwise, if any node is to receive data, the snooping node records the LSR of the cache request for future processing (817) and sets LSR_V(r) to indicate AVAILABLE (818).

(7) Handling of a PCSR with Coherence Conflict Detection (at a Snooping Node)

Figure 9:
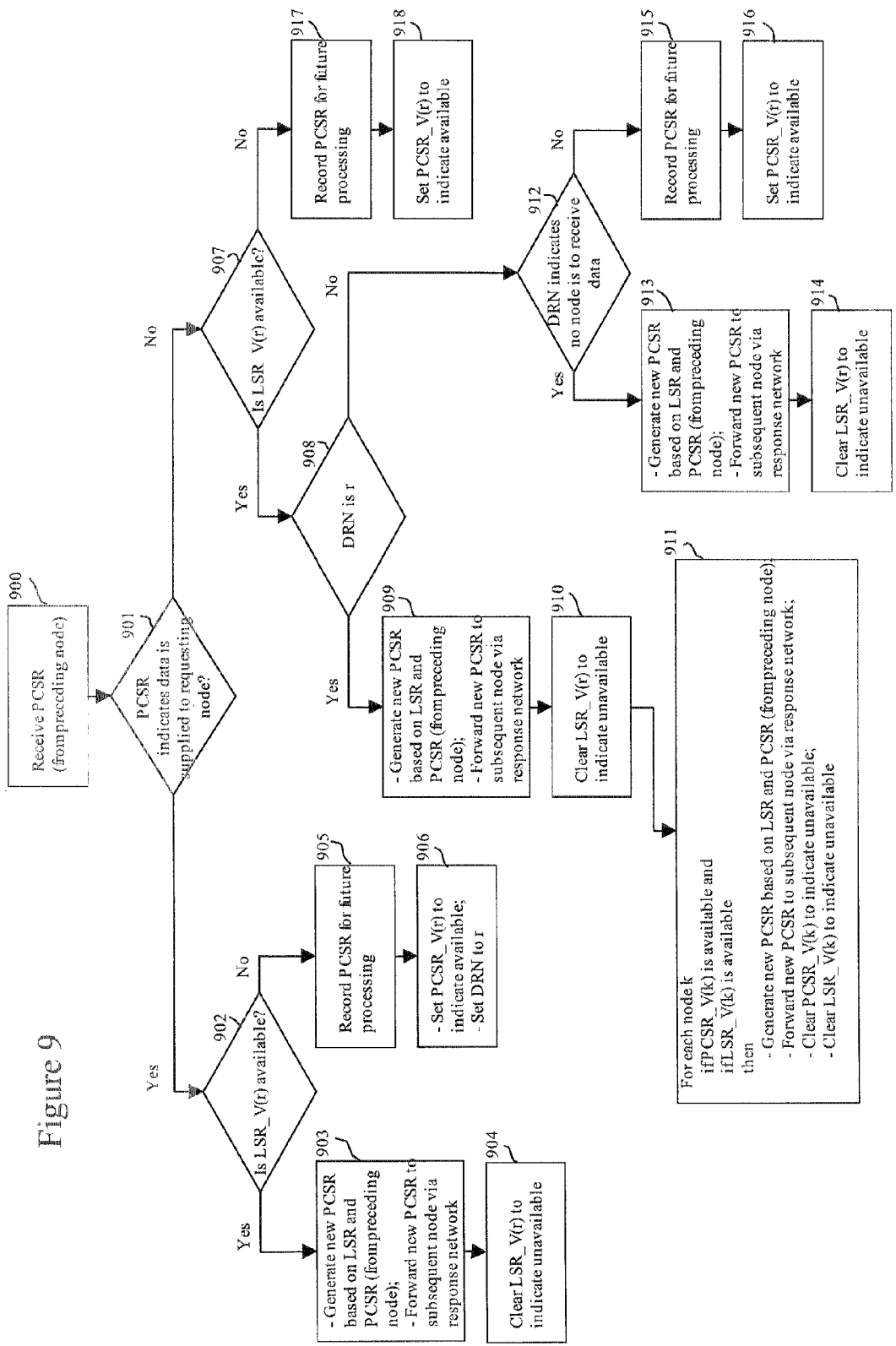
FIG. 9 shows a flow diagram illustrating how a snooping node, with coherence conflict detection support, handles an incoming a PCSR.

FIG. 9 shows a flow diagram illustrating how a snooping node, with coherence conflict support, handles an incoming PCSR of a cache request. When a snooping node receives the PCSR of a cache request from the preceding node (900), the snooping node checks whether the PCSR of the cache request received from the preceding node indicates that data is supplied to the requesting node (901).

If the PCSR of the cache request received from the preceding node indicates that data is supplied to the requesting node, the snooping node checks whether LSR_V(r) is AVAILABLE (902). If LSR_V(r) is AVAILABLE, the snooping node generates a new PCSR of the cache request based on the PCSR of the cache request received from the preceding node and the LSR of the cache request and forwards the new PCSR of the cache request to the subsequent node using the response network (903). The snooping node clears LSR_V(r) to indicate UNAVAILABLE (904). Otherwise, if LSR_V(r) is UNAVAILABLE, the snooping node records the PCSR of the cache request received from the preceding node for future processing (905), and sets PCSR_V(r) to indicate AVAILABLE and DRN to r (906).

If the PCSR of the cache request received from the preceding node indicates that data is not supplied to the requesting node, the snooping node checks whether LSR_V(r) is available (907). If LSR_V(r) is UNAVAILABLE, the snooping node records the PCSR of the cache request received from the preceding node for future processing (917) and sets PCSR_V (r) to indicate AVAILABLE (918). If LSR_V(r) is AVAILABLE, the snooping node checks whether the DRN is set to r (908).

If the DRN is set to r, the snooping node generates a new PCSR of the cache request based on the PCSR of the cache request received from the preceding node and the LSR of the cache request, forwards the new PCSR of the cache request to the subsequent node using the response network (909), and clears LSR_V(r) to indicate UNAVAILABLE (910). For each node k, if PCSR_V(k) indicates AVAILABLE and LSR_V(k) indicates AVAILABLE, the snooping node generates a new PCSR based on the corresponding recorded PCSR and the corresponding recorded LSR, forwards the new PCSR to the subsequent node using the response network, and clears PCSR_V(k) and LSR_V(k) to indicate UNAVAILABLE (911).

If the DRN is not set to r, the snooping node checks whether the DRN indicates that no node is to receive data (912). If no node is to receive data, the snooping node generates a new PCSR of the cache request based on the PCSR of the cache request received from the preceding node and the LSR of the cache request, forwards the new PCSR of the cache request to the subsequent node using the response network (913), and clears LSR_V(r) to indicate UNAVAILABLE (914). Otherwise, if any node is to receive data, the snooping node records the PCSR of the cache request received from the preceding node for future processing (915) and sets PCSR_V(r) to indicate AVAILABLE (916).

Snoop Filtering Enhancement

A ring-based response collection system can be enhanced with an appropriate snoop filter to avoid unnecessary cache requests and unnecessary local cache snoop operations. When a requesting node receives a cache request, the corresponding snoop filter can determine that some snooping nodes do not need to be snooped. For example, if the snoop filter suggests that a cache data request be filtered for a node, then either the requested data cannot be found in the node, or even though the requested data is cached in the node, the requested data cannot be supplied from the node. In contrast, if the snoop filter suggests that a read request not be filtered for a node, the requested data may be supplied from the node.

We now show how snoop filtering can be used to reduce unnecessary cache requests and unnecessary local cache snoop operations in handling cache requests.

If the requesting node receives a cache data request, the requesting cache handles the cache data request using the same methods from FIG. 3, except that blocks 301 and 302 are modified to the following:

(301) The requesting node obtains a list of snooping nodes to which it may be necessary to send the cache request (snooping-list of the cache request). The requesting node sends the cache request only to the snooping nodes in the list using the request network.

(302) The requesting node sends the PCSR of the cache request to the first snooping node of the cache request using the response network, together with the list of snooping nodes to which the requesting node sent the cache request (PCSR and snooping-list).

In addition, all references to CSR should be read as CSR and snooping-list. However, the requesting node does not use the received snooping-list of the cache request after the requesting node receives the CSR and snooping-list of a cache request, so no further changes are needed.

If the requesting node receives a cache data-and-ownership request, the requesting cache handles the cache data-and-ownership request using the same methods from FIG. 4, except that blocks 401 and 402 are modified to the following:

(401) The requesting node obtains a list of snooping nodes to which it may be necessary to send the cache request (snooping-list of the cache request). The requesting node sends the cache request only to the snooping nodes in the list using the request network.

(402) The requesting node sends the PCSR of the cache request to the first snooping node of the cache request using the response network, together with the list of snooping nodes to which the requesting node sent the cache request (PCSR and snooping-list).

In addition, all references to CSR should be read as CSR and snooping-list. However, the requesting node does not use the snooping-list of a cache request after the requesting node receives the CSR and snooping-list of a cache request, so no further changes are needed.

If the requesting node receives a cache ownership request, the requesting cache handles the cache ownership request using the same methods from FIG. 5, except that blocks 501 and 502 are modified to the following:

(501) The requesting node obtains a list of snooping nodes to which it may be necessary to send the cache request (snooping-list of the cache request). The requesting node sends the cache request only to the snooping nodes in the list using the request network.

(502) The requesting node sends the PCSR of the cache request to the first snooping node of the cache request using the response network, together with the list of snooping nodes to which the requesting node sent the cache request (PCSR and snooping-list).

In addition, all references to CSR should be read as CSR and snooping-list. However, the requesting node does not use the received snooping-list of a cache request after the requesting node receives the CSR and snooping-list of the cache request, so no further changes are needed.

Figure 10:
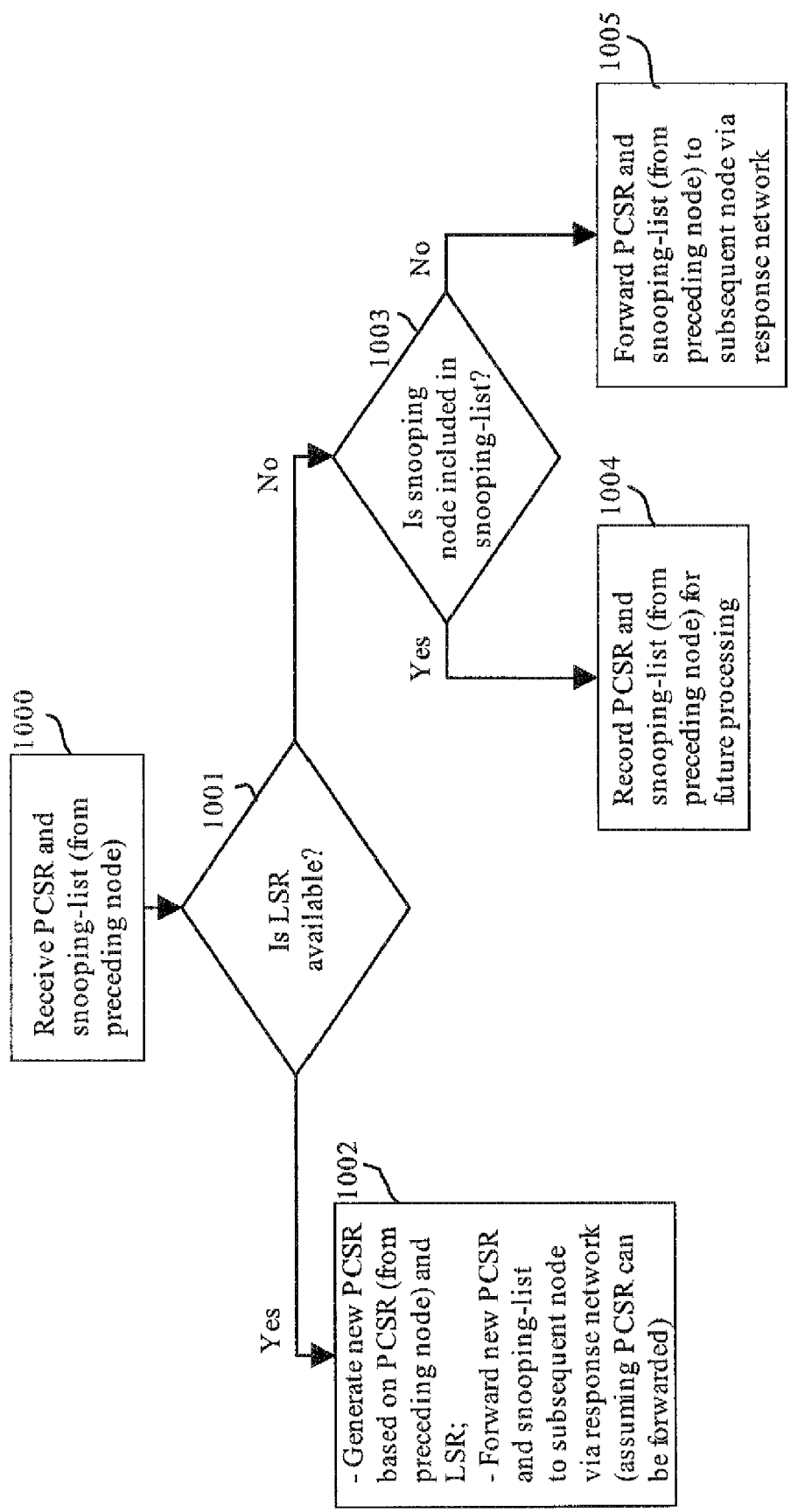
FIG. 10 shows a flow diagram illustrating how a snooping node handles an incoming PCSR with a snooping-list when snoop filtering is used.

FIG. 10 shows a flow diagram illustrating how a snooping node handles an incoming PCSR with a snooping-list of a cache request when snoop filtering is used. When a snooping node receives a PCSR and snooping-list of the cache request from the preceding node (1000), the snooping node checks whether there is an LSR of the cache request available at the snooping node (1001). If there is an LSR of the cache request available at the snooping node, the snooping node generates a new PCSR of the cache request based on the PCSR of the cache request received from the preceding node and the available LSR of the cache request (1002). The snooping node forwards the new PCSR and snooping-list of the cache request to the subsequent node using the response network (1003). Otherwise, if there is not an LSR of the cache request available at the snooping node, the snooping node checks whether the snooping node is included in the received snooping-list of the cache request (1004). If the snooping node is included in the received snooping-list of the cache request, the snooping node records the PCSR and snooping-list of the cache request received from the preceding node for future processing (1005). Otherwise, if the snooping node is not included in the received snooping-list of the cache request, the snooping node forwards the PCSR and snooping-list of the cache request received from the preceding node to the subsequent node using the response network.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 11:
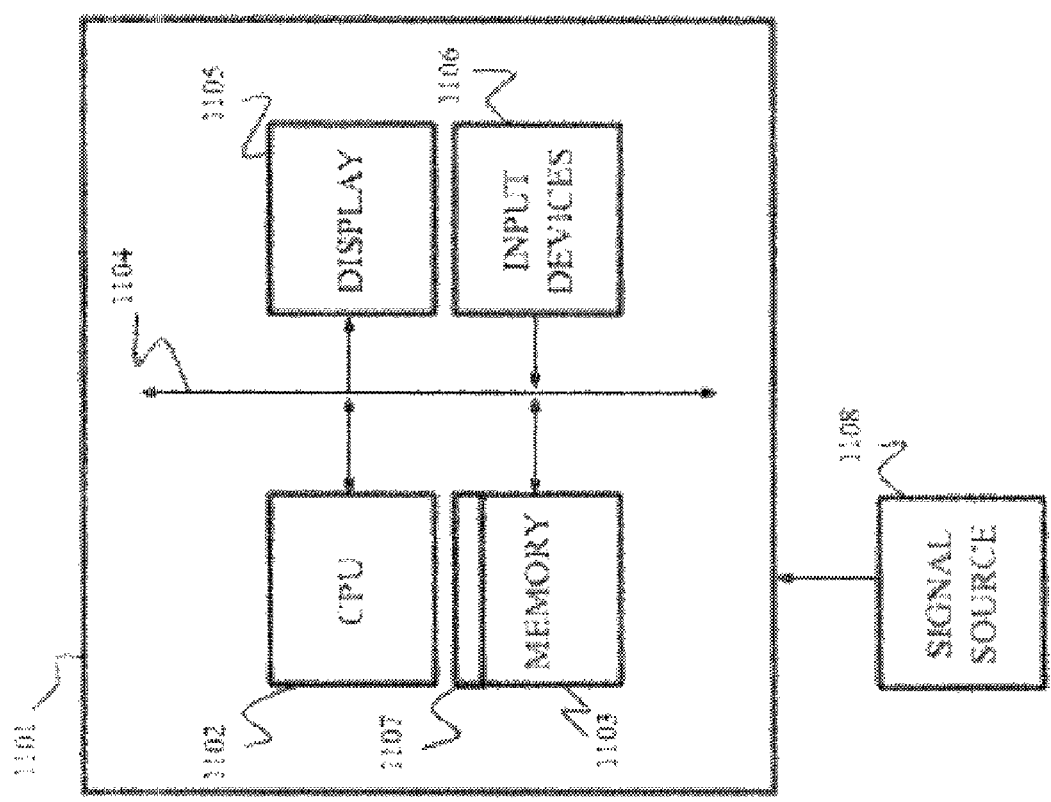
FIG. 11 shows a diagram of a computer system node according to an embodiment of the present disclosure.

Referring to FIG. 11, according to an embodiment of the present invention, a computer system (1101) for enforcing cache coherence in a network-based multiprocessor system can comprise, inter alia, a central processing unit (CPU) (1102), a memory (1103) and an input/output (I/O) interface (1104). The computer system (1101) is generally coupled through the I/O interface (1104) to a display (1105) and various input devices (1106) such as a mouse and keyboard. The support circuits can include circuits such as cache, power supplies, clock circuits, and a communications bus. The memory (1103) can include random access memory (RAM), read only memory (ROM), disk drive, tape drive, or a combination thereof. The present invention can be implemented as a routine (1107) that is stored in memory (1103) and executed by the CPU (1102) to process the signal from the signal source (1108). As such, the computer system (1101) is a general-purpose computer system that becomes a specific-purpose computer system when executing the routine (1107) of the present invention.

The computer platform (1101) also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a mechanism and method for enforcing cache coherence in a network-based multiprocessor system, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A computer-implemented method for enforcing cache coherence comprising:

multicasting a cache request for a memory address from a requesting node without an ordering restriction over a network;

collecting, by the requesting node, a combined snoop response of the cache request over a unidirectional ring embedded in the network;

enforcing cache coherence for the memory address at the requesting node, according to the combined snoop response;

supplying data of the memory address to the requesting node over the network; and using the data at the requesting node, before the snoop responses of the cache request are collected by the requesting node; and completing the cache request at the requesting node upon receiving the data and the snoop responses of the cache request.

2. The computer-implemented method of claim 1, further comprising:

receiving the cache request at a snooping node from the requesting node;

performing a local cache snoop operation at the snooping node and generating an LSR (local snoop response) of the cache request; and recording the LSR at the snooping node for later processing.

3. The computer-implemented method of claim 1, further comprising:

receiving the cache request at a snooping node from the requesting node;

performing a local cache snoop operation at the snooping node and generating an LSR (local snoop response) of the cache request;

determining a new PCSR (partially combined snoop response) of the cache request based on the LSR and a preceding PCSR of the cache request from a preceding node, wherein the preceding node is preceding to the snooping node in the unidirectional ring embedded in the network; and forwarding the new PCSR of the cache request from the snooping node to a subsequent node over the unidirectional ring embedded in the network, wherein the subsequent node is subsequent to the snooping node in the unidirectional ring embedded in the network.

4. The computer-implemented method of claim 1, further comprising:

receiving a preceding PCSR (partially combined snoop response) at a snooping node from a preceding node, wherein the preceding node is preceding to the snooping node in the unidirectional ring embedded in the network; and recording the preceding PCSR at the snooping node for later processing.

5. The computer-implemented method of claim 1, further comprising:

receiving a preceding PCSR (partially combined snoop response) at a snooping node from a preceding node, wherein the preceding node is preceding to the snooping node in the unidirectional ring embedded in the network;

determining a new PCSR of the cache request based on the preceding PCSR and a previously recorded LSR (local snoop response) of the cache request; and forwarding the new PCSR of the cache request from the snooping node to a subsequent node over the unidirectional ring embedded in the network, wherein the subsequent node is subsequent to the snooping node in the unidirectional ring embedded in the network.

6. The computer-implemented method of claim 1, further comprising:

receiving a preceding PCSR (partially combined snoop response) and a snooping list at a snooping node from a preceding node, wherein the snooping list comprises at least one node that needs to be snooped for the cache request; and recording the preceding PCSR at the snooping node for later processing, if the snooping node is included in the snooping list.

7. The computer-implemented method of claim 1, further comprising:

receiving a preceding PCSR (partially combined snoop response) and a snooping list at a snooping node from a preceding node, wherein the snooping list comprises at least one node that needs to be snooped for the cache request; and forwarding the preceding PCSR and the snooping list to a subsequent node over the unidirectional ring embedded in the network, if the snooping node is not included in the snooping list.

8. The computer-implemented method of claim 1, further comprising:

receiving a preceding PCSR (partially combined snoop response) and a snooping list at a snooping node from a preceding node, wherein the snooping list comprises at least one node that needs to be snooped for the cache request;

determining a new PCSR of the cache request based on the preceding PCSR and a previously recorded LSR (local snoop response) of the cache request; and forwarding the new PCSR of the cache request and the snooping list from the snooping node to a subsequent node over the unidirectional ring embedded in the network.

9. The computer-implemented method of claim 1, wherein supplying the data to the requesting node comprises one of the supplying the data from a snooping node or supplying the data from memory.

10. The computer-implemented method of claim 1, wherein the cache request for the memory address is a data request, a data-and-ownership request or an ownership request.

11. The computer-implemented method of claim 1, further comprising:

multicasting a second cache request for a second memory address from the requesting node without an ordering restriction over the network;

collecting, by the requesting node, a second combined snoop response of the second cache request over a second unidirectional ring embedded in the network; and enforcing cache coherence for the second memory address at the requesting node, according to the second combined snoop response.

12. A system of cache coherence, comprising:

a plurality of nodes connected by a network, the network comprising an embedded unidirectional ring and a second embedded unidirectional ring; and a cache coherence mechanism implementing cache coherence for the system, wherein the cache coherence mechanism uses the network to deliver a cache request for a memory address without any ordering restriction, and uses the embedded unidirectional ring to collect a combined snoop response for the cache request, wherein the cache coherence mechanism uses the network to deliver a second cache request for a second memory address without any ordering restriction, and uses the second embedded unidirectional ring to collect a second combined snoop response for the second cache request.

13. The system of claim 12, the plurality of nodes further comprising:

a requesting node, a first snooping node that is subsequent to the requesting node in the embedded unidirectional ring, and a last snooping node that is preceding to the requesting node in the embedded unidirectional ring, wherein when a cache miss of the memory address occurs in a requesting cache in the requesting node, the requesting node multicasts the cache request for the memory address to at least one snooping node using the network without any ordering restriction, and sends an initial PCSR (partially combined snoop response) to the first snooping node, wherein the requesting node uses requested data of the cache request for computation if the requesting node receives the requested data over the network, and wherein the requesting node completes the cache request at the requesting node upon receiving the requested data and the snoop responses for the cache request.

14. The system of claim 12, the plurality of nodes further comprising:

a snooping node, a preceding node that is preceding to the snooping node in the embedded unidirectional ring, and a subsequent node that is subsequent to the snooping node in the embedded unidirectional ring, wherein when the snooping node receives the cache request, if a preceding PCSR (partially combined snoop response) of the cache request received from the preceding node is not recorded in the snooping node, the snooping node performs a local cache snoop operation to generate an LSR (local snoop response), and records the LSR for later processing, and wherein when the snooping node receives the cache request, if the preceding PCSR of the cache request received from the preceding node is recorded in the snooping node, the snooping node performs a local cache snoop operation to generates the LSR, computes a new PCSR based on the preceding PCSR and the LSR, and forwards the new PCSR to the subsequent node.

15. The system of claim 12, the plurality of nodes further comprising:

a snooping node, a preceding node that is preceding to the snooping node in the embedded unidirectional ring, and a subsequent node that is subsequent to the snooping node in the embedded unidirectional ring, wherein when the snooping node receives a preceding PCSR (partially combined snoop response) of the cache request from the preceding node, if an LSR (local snoop response) of the cache request is not recorded at the snooping node, the snooping node records the PCSR for later processing, and wherein when the snooping node receives the preceding PCSR of the cache request from the preceding node, if the LSR of the cache request is recorded at the snooping node, the snooping node computes a new PCSR based on the preceding PCSR and the LSR, and forwards the new PCSR to the subsequent node.

16. The system of claim 12, the plurality of nodes further comprising:

a snooping node, a preceding node that is preceding to the snooping node in the embedded unidirectional ring, and a subsequent node that is subsequent to the snooping node in the embedded unidirectional ring, wherein when the snooping node receives a preceding PCSR (partially combined snoop response) of the cache request and a snooping list from the preceding node, if the snooping node is not included in the snooping list, the snooping node forwards the preceding PCSR and the snooping list to the subsequent node, wherein when the snooping node receives the preceding PCSR of the cache request and the snooping list from the preceding node, if the snooping node is included in the snooping list and if an LSR (local snoop response) of the cache request is not recorded at the snooping node, the snooping node records the preceding PCSR and the snooping list for later processing, and wherein when the snooping node receives the preceding PCSR of the cache request and the snooping list from the preceding node, if the snooping node is included in the snooping list and if the LSR of the cache request is recorded at the snooping node, the snooping node computes a new PCSR based on the preceding PCSR and the LSR, and forwards the new PCSR and the snooping list to the subsequent node.

17. The system of claim 12, wherein the cache request for the memory address is a data request, a data-and-ownership request or an ownership request.

18. A computer readable medium embodying instructions executable by a processor to perform a method for enforcing cache coherence, the method steps comprising:

multicasting a cache request for a memory address from a requesting node without an ordering restriction over a network;

collecting, by the requesting node, a combined snoop response of the cache request over a unidirectional ring embedded in the network;

enforcing cache coherence for the memory address at the requesting node, according to the combined snoop responses;

supplying data of the memory address to the requesting node over the network; and using the data at the requesting node, before the snoop responses of the cache request are collected by the requesting node; and completing the cache request at the requesting node upon receiving the data and the snoop responses of the cache request.

* * * * *